Oct. 9, 1928. 1,687,005
C. A. BROCK
CONVEYER CHAIN
Filed Feb. 25, 1927 3 Sheets-Sheet 1
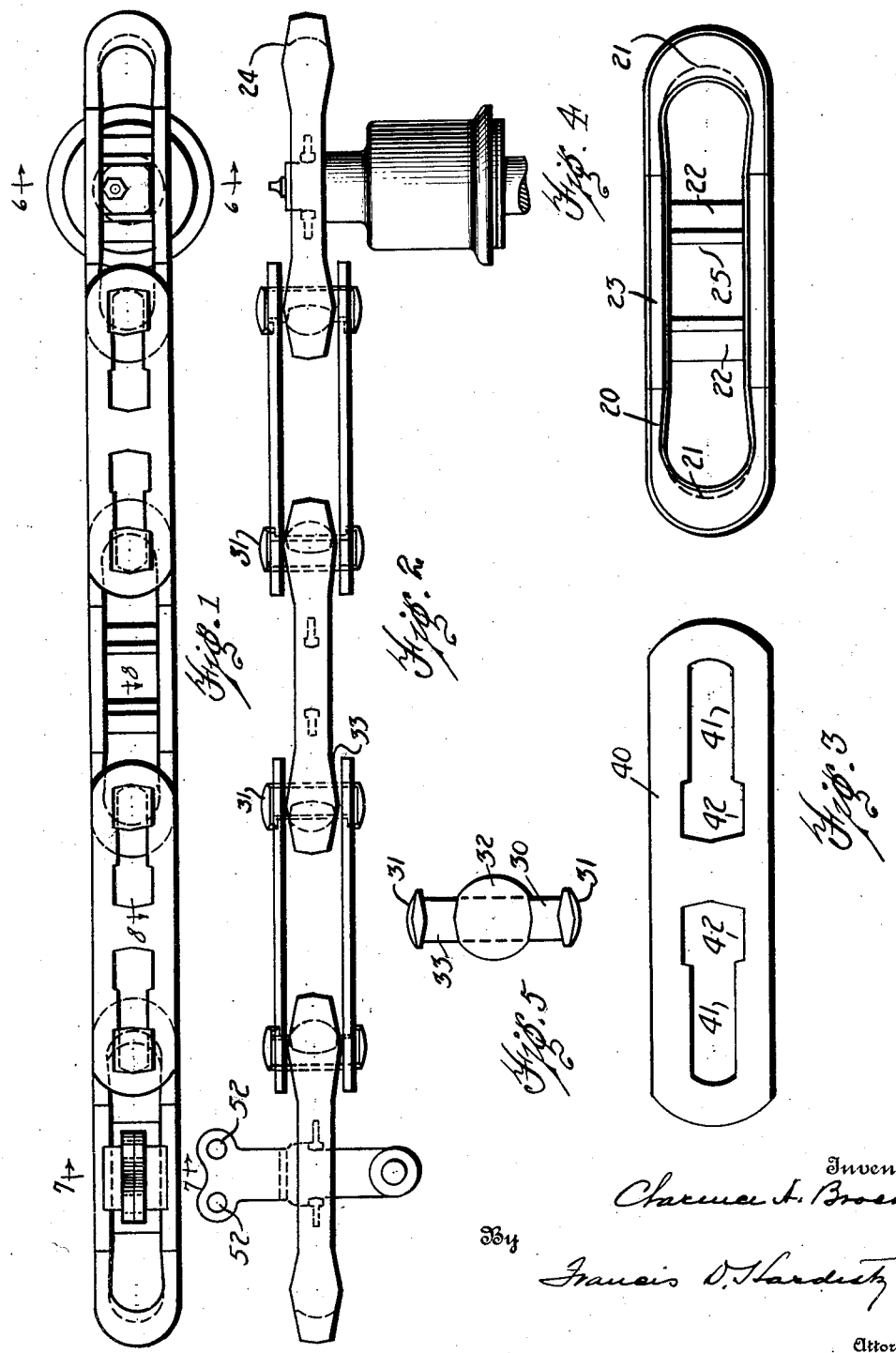

Oct. 9, 1928.  1,687,005
C. A. BROCK
CONVEYER CHAIN
Filed Feb. 25, 1927   3 Sheets-Sheet 2
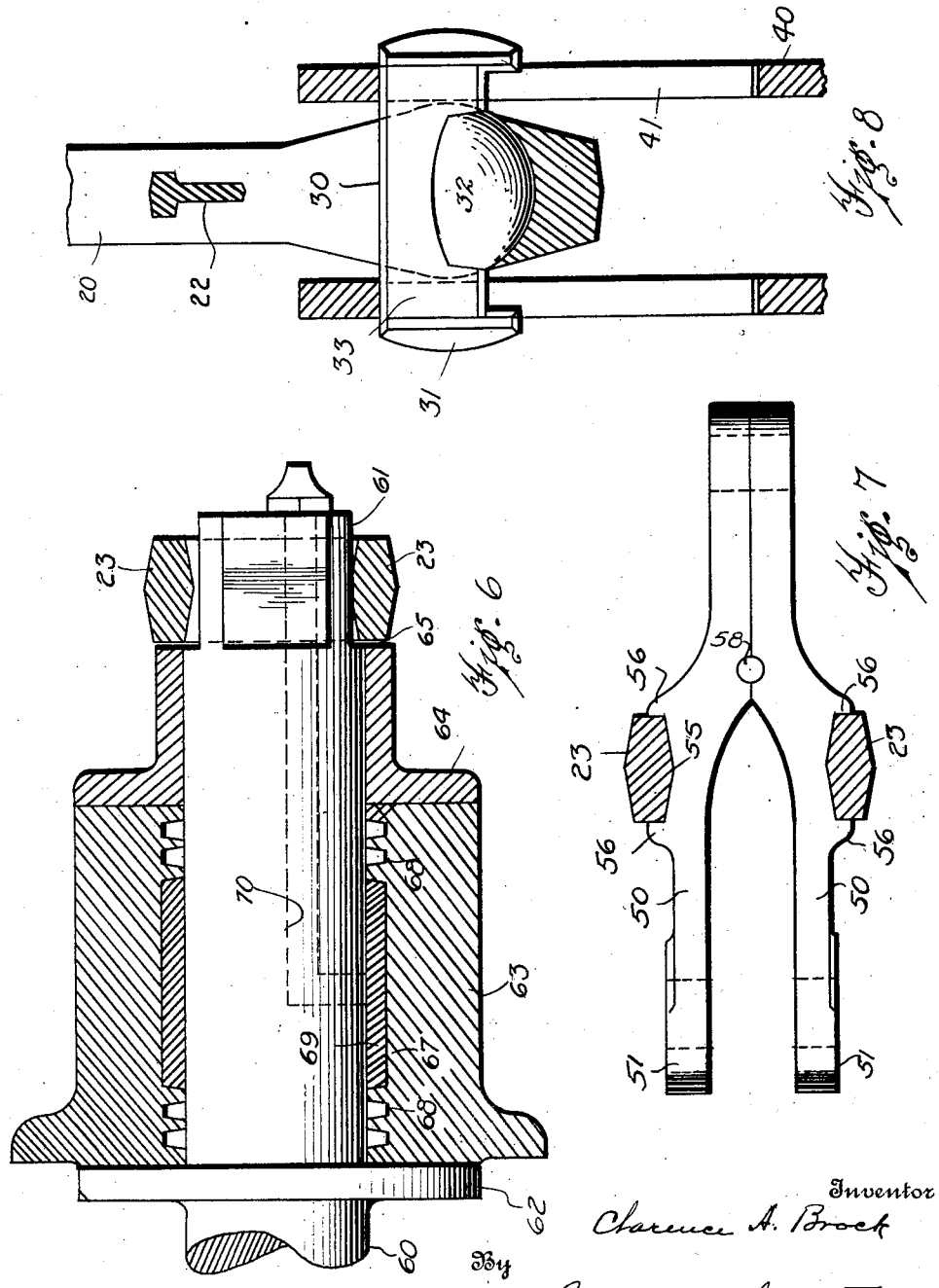
Inventor
Clarence A. Brock
By
Francis D. Hardesty
Attorney Oct. 9, 1928.
C. A. BROCK
1,687,005
CONVEYER CHAIN
Filed Feb. 25, 1927   3 Sheets-Sheet 3
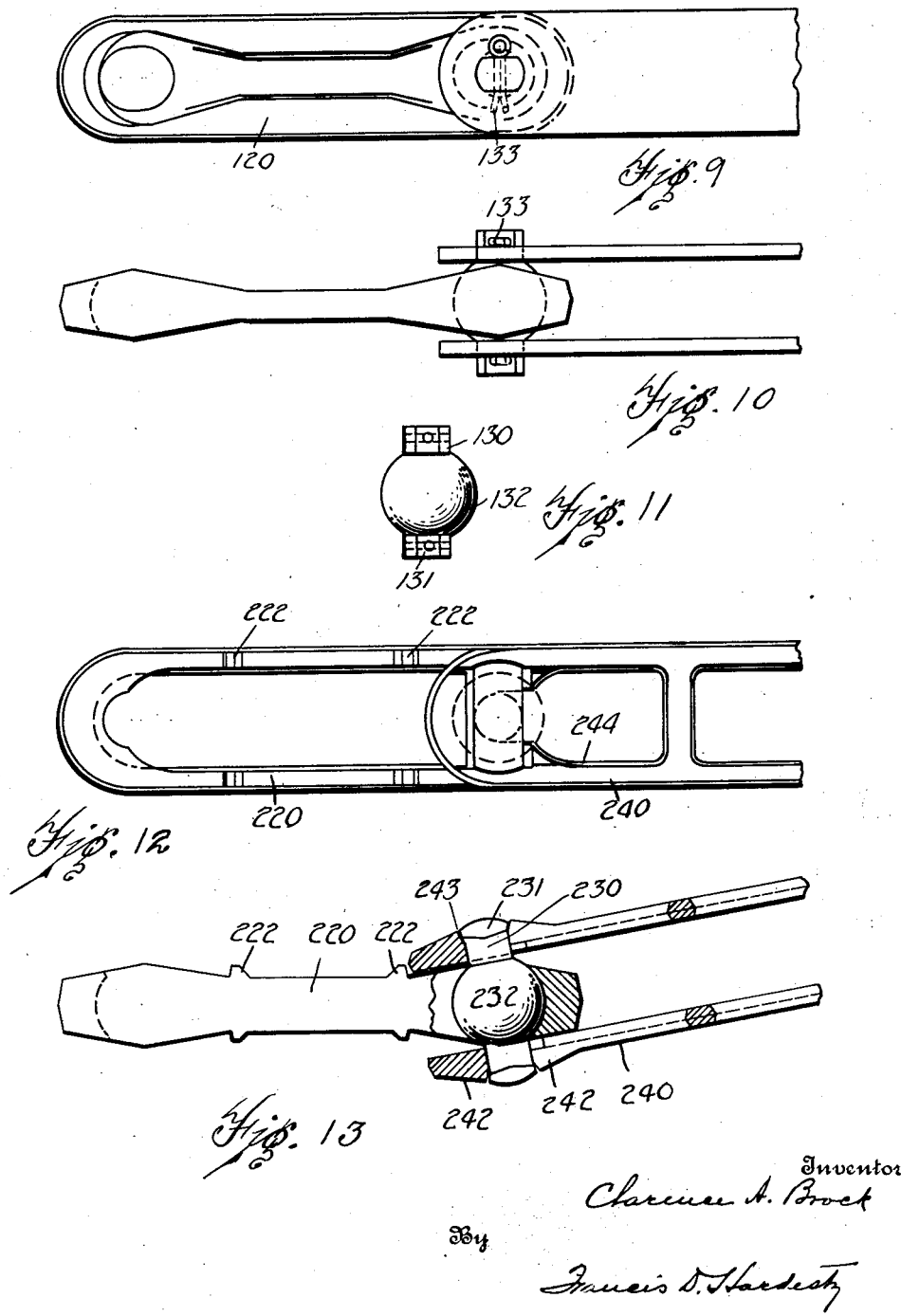

Patented Oct. 9, 1928.

1,687,005

UNITED STATES PATENT OFFICE.

CLARENCE A. BROCK, OF DETROIT, MICHIGAN.

CONVEYER CHAIN.

Application filed February 25, 1927. Serial No. 170,793.

The present invention relates to conveyer chains.

Among the objects of the invention is a chain which is capable of a limited universal movement at the link ends.

Another object is a chain that may be readily assembled and disassembled without the use of tools but which is free from the possibility of becoming disconnected under conditions of use.

Other objects will readily appear to those skilled in the art upon reference to the following description and accompanying drawings in which:—

Fig. 1 is a plan view of a portion of the chain;

Fig. 2 is a side view of the same with certain parts attached;

Fig. 3 is an elevation of a link part;

Fig. 4 is a plan view of another link part;

Fig. 5 is an elevation of one of the pins;

Fig. 6 is an enlargment of a section on line 6—6 of Fig. 1;

Fig. 7 is a similar section on line 7—7 of Fig. 1;

Fig. 8 is a similar section on line 8—8 of Fig. 1;

Fig. 9 is a side view of a modified form of chain;

Fig. 10 is a plan view of the chain of Fig. 9;

Fig. 11 is an elevation of the pin of Fig. 9;

Fig. 12 is a plan view of another modification;

Fig. 13 is a side view and partial section of the chain of Fig. 12.

As indicated in the drawings the chain is made up of three different pieces. One piece is itself a complete link 20 and this is shown in Fig. 4. A second piece is the pin 30, shown in Fig. 5. The third piece is the link part 40 shown in Fig. 3. The latter piece 40 forms one side of a link so that two are used to make the link.

Link 20 consists of a closed loop formed with spherical seats 21 inside of its ends and with cross members 22 between and integral with the sides 23. These cross members 22 are T-shaped in section as shown in Fig. 6, and as indicated in Figs. 2 and 6, the ends of the link 20 are somewhat thicker at the seats 21 than elsewhere, being tapered as at 24 on both sides of the thickened portion. The cross members 22 are preferably spaced the same distance as that between the sides 23 so as to form a square opening 25 through the link.

The pin 30 is in the form shown in Figs. 1 to 6 headed at both ends as at 31 and provided with a hemispherical portion 32 intermediate its ends and equally spaced a short distance from heads 31. The pin between heads 31 and portion 32 is flattened laterally as as 33.

The link part 40 consists of a flat piece rounded at its ends and provided with two slots 41 which toward the ends of the part are of such width as to fit the flattened parts 33 of pin 30. The other ends 42 of the slots are of such width as to pass the heads 31 of pins 30.

The assembly of the chain consists simply in placing the pins 30 in the ends of links 20, with the ball portions 32 in bearings 21, then slipping on over the pin heads 31 the parts 40 and moving the pins to the outer ends of the slots 41.

The form of chain shown in Figs. 9, 10 and 11 is quite similar in many respects to that of Figs. 1 to 6. In this form, however, the pin 130 has a complete ball 132 intermediate its and ends and is not headed. The ends are flattened and provided with holes 131 for the reception of cotter pins 133. The link 120 is shown somewhat the same as link 20 but without the cross members, and the link part 140 is shown as provided with openings fitting over the pin ends.

The form of chain shown in Figs. 12 and 13 likewise has a pin with a full ball 232 but this pin is headed as at 231. The link 220 is much the same as link 20 but has no cross members. It is however provided with the stops 222 which prevent the telescoping of the links when the chain is slack by striking the ends of the adjacent link parts. The link parts 240 are of somewhat different form from the corresponding parts in the other chains. In this form, parts 240 are thickened at their ends as at 242 and a cross groove 243 formed in the thickened portion. The body portion of the part 240 is provided with an opening 244 which is narrowed at the end to fit the neck of pin 230.

In assembling this form of chain, the pin is assembled with parts 240 near the central portion of line 220 and then moved to the end of the latter. The preferred form of chain is that of Figs. 1 to 8 as it lends itself readily to the attachment of auxiliary parts such as rollers, trolleys and hooks, without the use of bolts, rivets or the like.

Figs. 1, 2 and 8 show a form of trolley attachment which is easily and quickly secured to the chain. This device consists of two identical members 50 provided at one end with bearing bosses 51 and cut away to permit placing a trolley wheel between them when in opposed relation. The cut away portion extends about half way of the length of the piece as shown in Fig. 8. The ends of the pieces 50 opposite the bosses 51 are provided with eyes 52 for holding the pieces together or securing wheels (not shown) thereto. The two pieces 50, when opposed as shown in Fig. 8, have a square dimension at 55 just below the upper end of the cut away part and this square part is adapted to fit into the square opening 25, lugs 56 being provided above and below part 55 to fix the pieces against movement up or down.

In order to insert this device into link 20, the two lower ends are brought together and slipped through opening 25. They are then separated and fastened at top or bottom or both. If desired, a further assurance against relative movement of the two pieces may be had by placing a pin or bosses in a hole 58 formed by two cross channels in the contacting inner faces of the pieces.

Attachments may be secured to the chain by the means shown in Figs. 1, 2 and 7. In Fig. 1 one roller or track wheel of a pair is shown, the pair being used, of course, with two parallel chains. In such an arrangement, a shaft 60 will be provided with squared ends 61 to fit in parallel openings 25 and will also be provided near its ends with discs 62 secured thereto, preferably by welding. On the end of the shaft and against disc 62 will be placed a track wheel 63 and outside of this a flanged collar 64. The outer extremity 65 of this collar is about flush with the shoulders formed by squaring the end of the shaft, so that the link 20 holds the same in place. If desired, collar 64 may be secured to the shaft in any other manner.

It is preferred to internally groove wheel 63 as at 68 for grease dust-seal and groove 67 when needed may contain anti-friction metal 69. Grooves 68 tend, when filled with grease, to prevent the entrance of dust. Oil may be supplied by providing a channel 70 in shaft 60 leading from the point shown, or from a suitable hole in collar 64, and a suitable nipple 71 may be used to close the outer end of the channel and furnish connection for a grease or oil "gun".

Having now described the invention and the preferred forms of embodiment thereof, it is to be understood that the said invention is to be limited not by the specific details herein set forth and illustrated but only by the scope of the claims which follow.

I claim:—

1. In a chain a link having a spherical seat in each end thereof and a rectangular opening intermediate its ends.

2. A chain comprising a link consisting of an elongated loop having its inner end surfaces formed with spherical concave seats, and integral cross bracing members between the sides of said loop, said sides and cross members defining a square seat adapted to receive a squared portion of an accessory device.

CLARENCE A. BROCK.